United States Patent [19]

Grotheer

[11] 4,159,929
[45] Jul. 3, 1979

[54] CHEMICAL AND ELECTRO-CHEMICAL PROCESS FOR PRODUCTION OF ALKALI METAL CHLORATES

[75] Inventor: Morris P. Grotheer, Lewiston, N.Y.

[73] Assignee: Hooker Chemicals & Plastics Corp., Niagara Falls, N.Y.

[21] Appl. No.: 906,796

[22] Filed: May 17, 1978

[51] Int. Cl.² .......................... C25B 1/14; C25B 1/26
[52] U.S. Cl. ........................................ 204/95; 204/98; 204/128
[58] Field of Search ................. 204/95, 98, 128, 257, 204/263, 266

[56] References Cited

U.S. PATENT DOCUMENTS

| | | | |
|---|---|---|---|
| 3,464,901 | 9/1969 | Grotheer et al. | 204/95 |
| 3,518,173 | 6/1970 | Crane | 204/95 |
| 3,574,095 | 4/1971 | Westerlund | 204/95 X |
| 3,690,845 | 9/1972 | Grotheer | 423/462 X |
| 3,897,320 | 7/1975 | Cook, Jr. | 204/95 |

FOREIGN PATENT DOCUMENTS 50-2025 10/1975 Japan.

Primary Examiner—Arthur C. Prescott
Attorney, Agent, or Firm—Peter F. Casella; Howard M. Ellis

[57] ABSTRACT

Both crystals and solutions containing alkali metal chlorates are continuously prepared by chemical followed by electrochemical steps whereby a reaction product comprising alkali metal chloride, chlorate and hypochlorite is prepared by mixing and chemically reacting an alkali metal hydroxide solution with chlorine under conditions which favor and promote the conversion of the alkali metal hypochlorite formed during the initial chemical reaction to alkali metal chlorate without the need for further dilution and acidification of the mixture during the chemical reaction. A portion of the chemical product is electrolyzed in an electrolytic cell to increase the concentration of chlorate for making sodium chlorate crystals and/or R-2 solution, and a portion of the chemical product is also recycled for further use in the chemical reaction with chlorine and alkali metal hydroxide for the continuous preparation of alkali metal chlorate.

13 Claims, 1 Drawing Figure

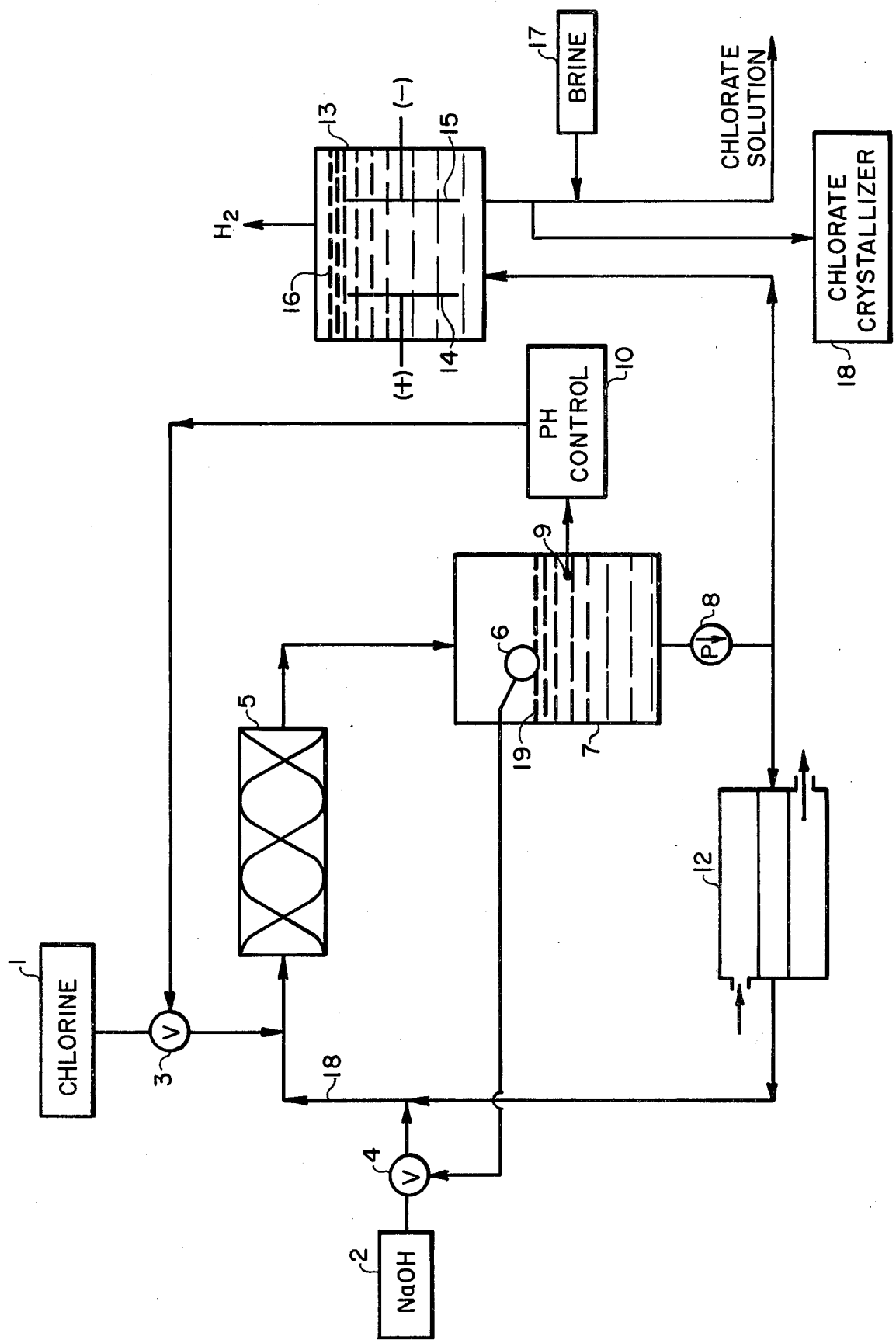

CHEMICAL AND ELECTRO-CHEMICAL PROCESS FOR PRODUCTION OF ALKALI METAL CHLORATES

BACKGROUND OF THE INVENTION

This invention relates generally to a process for preparing alkali metal chlorates, and more particularly, to an improved method for making various forms of inorganic chlorate, such as sodium chlorate crystals and sodium chlorate-containing solutions especially suitable for use in processes and devices for generating chlorine dioxide.

Alkali metal chlorate, and in particular sodium chlorate has been produced by the electrolysis of aqueous solutions of alkali metal chlorides, such as sodium chloride in electrolytic cells equipped with or without membranes or diaphragms. Typically, electrolytic cells make chlorates within the cell by reacting chlorine produced at the anode with alkali metal hydroxide produced at the cathode. One such representative electrolytic cell of this type is shown in U.S. Pat. No. 3,732,153 by C. J. Harke et al. Various other arrangements of both electrochemical and combinations of electrochemical and chemical methods for manufacturing chlorates have also been proposed, such as the use of a two compartment permselective membrane equipped electrolytic cell operating in conjunction with a diaphragmless-type electrolytic chlorate cell. This method is disclosed in U.S. Pat. No. 3,897,320 to E. H. Cook. However, to obtain improved current efficiencies and significant reductions in electrical power requirements in the production of inorganic chlorate, U.S. Pat. 3,464,901 provides for the electrochemical preparation of chlorine and caustic soda in a diaphragm type chloralkali cell. The caustic soda containing unreacted alkali metal chloride and alkali metal chlorate is then removed from the cell and mixed and chemically reacted with chlorine from the anolyte of the cell. The chemical reaction is carried out at a pH of 6 to 8 to convert the alkali metal hypochlorite to chlorate. However, in order to maintain the conditions most favorable for converting hypochlorite to chlorate additional caustic and/or acid over and above that supplied by the cell has to be added to the reaction mixture. In the case of Japanese Pat. No. 792,025 dilute chlorine is reacted with less than 20 percent caustic soda to produce a concentrated sodium hypochlorite solution with sufficient caustic remaining in it to produce a pH of 8 to 10. The solution is subsequently diluted from about 13 to 15 percent sodium hypochlorite to 6 to 8 percent sodium hypochlorite with recycled stream of alkali metal chloride and chlorate. The diluted stream is then acidified with hydrochloric acid to a pH of about 6.0 and finally fed to an electrolysis cell.

It has now been discovered that in the process of chemically preparing an alkali metal chloride/chlorate-containing feedstock for the electrochemical preparation of alkali metal chlorate, the steps of dilution and acidification to achieve conditions most favorable for converting alkali metal hypochlorite to chlorate in the reaction mixture can be eliminated. The improved process of the present invention maximizes the conversion of alkali metal hypochlorite to chlorate without additional acid being added over and above that supplied as initial reactant in order to control or lower the pH during the mixing, reacting and ageing of the reaction mixture.

Accordingly, it is the principle object of the present invention to provide an improved continuous process for the combined chemical and electrochemical preparation of alkali metal chlorates.

It is a further object of the instant invention to provide a process which will maximize the chemical conversion of alkali metal hypochlorite to alkali metal chlorate without further acidification of the reaction mixture.

A still further object of the present invention is to prepare chemically a near neutral alkali metal hypochlorite/chlorate/ chloride solution requiring no further dilution with brine etc. or pH adjustment as the sole source of electrolyte feed for the electrolytic production of alkali metal chlorates.

These and other objects, features and advantages will become apparent to those skilled in the art after a reading of the following more detailed description.

PREFERRED EMBODIMENTS OF THE INVENTION

Broadly, the invention relates to a continuous process for the preparation of alkali metal chlorate-containing solution which comprises preparation of a reaction product (c) comprising an aqueous solution of an alkali metal chloride, alkali metal chlorate and alkali metal hypochlorite, said reaction product (c) prepared by mixing and chemically reacting (a) a solution comprising alkali metal hydroxide and (b) chlorine in an amount sufficient to maintain the pH of the reaction mixture at about 5 to 7.5 without further dilution and acidification during the process and to promote conversion of the alkali metal hypochlorite formed in reaction product (c) to alkali metal chlorate. Reactant (a) is prepared by diluting an aqueous solution of alkali metal hydroxide with at least a portion of reaction product (c). At least a portion of reaction product (c) is also electrolyzed in an electrolysis cell for the production of a solution having at least 335 grams per liter alkali metal chlorate and at least 100 grams per lier alkali metal chloride.

Although the present process can be used to effect the production of all alkali metal chlorates, such as lithium chlorate, potassium chlorate, sodium chlorate, and the like, the description herein will be directed more particularly to the production of sodium chlorate. However, it is to be understood that in describing the production of sodium chlorate, other alkali metal chlorates are also applicable and are to be included.

The invention will be readily understood by reference to the following descriptions of embodiments taken in conjunction with the drawing which provides a schematic representation of the chemical process and electrochemical production of alkali metal chlorate.

In the drawing, a solution of aqueous sodium hydroxide 2 having a concentration of about 18 to about 24 percent caustic soda, and more specifically, about 20 to about 22 percent caustic soda ia metered into line 18 by control valve 4. Line 18 also carries at least a portion of reaction product 19 (previously referred to as reaction product c) recycled from aging tank 7 by means of pump 8. Reaction product 19 is an aqueous solution comprising from about 70 to about 110 grams per liter sodium chlorate, and more specifically, about 90 to 100 grams per liter sodium chlorate. In addition to sodium chlorate, reaction product 19 also contains from about 0.2 to about 15 grams per liter sodium hypochlorite, and more particularly, from about 1 to about 8 grams per liter sodium hypochlorite. Sodium chloride is also present in reaction product 19 in an amount from about 250 to about 300 grams per liter, and more preferably, from about 260 to about 280 grams per liter. The caustic soda 2 e.g . . . 20 to 22% is diluted with reaction product 19 whereby the caustic concentration in line 18 fed into mixer/reactor 5 with chlorine 1 is in the range of about 2 to 7%, and more preferably about 4 to about 5 percent.

Chlorine 1 is ordinarily in a gaseous state and may be supplied by vaporizing liquid chlorine with steam by conventional means. It is also within the scope of this invention to employ at least as part of the chlorine feed residual chlorine from tank car return and/or chlorine-containing uncondensed gases from chlorine liquifaction, such as "blow-gas".

The reaction mixture comprising chlorine, caustic soda and recycled reaction product 19 is fed into mixer/reactor 5 which may be a static in-line mixer wherein hypochlorite is prepared. The hypochlorite-containing reaction mixture leaving 5 has a pH preferably of about 5 to about 7.5 and a temperature of about 75° C. is fed to aging tank 7 where most of the hypochlorite in reaction product 19 is converted to chlorate while maintaining a temperature of 70°–80° C. and a pH preferably of about 6 to about 7.

The amount of residual hypochlorite remaining in reaction product 19 is controlled by the residence time of the solution in aging tank 7. For purposes of this invention it is deemed desirable to reduce the hypochlorite content of reaction product 19 by converting to chlorate, so that residual hypochlorite is as low as about 1 gram per liter or possibly less. To achieve a hypochlorite concentration as low as 1 gram per liter the residence time for the solution in aging tank 7 will generally range from about 3 to about 90 minutes.

Other factors which generally control the formation of hypochlorite and conversion of the hypochlorite to chlorate include temperature of the reaction mixture in retention tank 7 which should be maintained at about 60° to about 90° C., and more specifically at about 70° to about 80° C. As the reaction temperature increases the rate of conversion of hypochlorite to chlorate accelerates. That portion of reaction product 19 recycled back by line 18 to mixer/reactor 5 is cooled by heat exchanger 12 to about 40° to about 60° C., since the reaction of chlorine and caustic soda is exothermic.

The reaction of chlorine 1, caustic soda 2 and reaction product 19 and the conversion of hypochlorite formed in mixer/reactor 5 to chlorate in aging tank 7 is controlled principally by pH. The reaction of chlorine and sodium hydroxide in mixer/reactor 5 where hypochlorite is initially formed should have a pH in the range of about 5 to about 7 and the pH most favorable for converting hypochlorite to chlorate in aging tank 7 is also from about 5 to about 7.5, and most preferred at a pH of 6 to 7. The pH of reaction product 19 in aging tank 7 is regulated by pH control 10 having electrode 9 positioned within tank 7 in contact with the reaction product. The pH of reaction product 19 is thereby constantly monitored by pH control 10. Should the pH of the reaction product become elevated, control 10 actuates control valve 3 feeding quantities of chlorine 1 in excess of the required stochiometric amounts for making hypochlorite. The additional chlorine in the reaction mixture will effectively maintain the pH of reaction product 19 at the level which most actively promotes conversion of hypochlorite to chlorate. Thus, the pH of the entire chemical process of the instant invention can be regulated by balancing the proportions of reactants i.e . . . chlorine initially employed in preparation of the hypochlorite reaction product, and simultaneously optimize the rate of conversion of hypochlorite to chlorate. Because hypochlorite is prepared and converted to chlorate at a pH substantially in the neutral range of about 7 the instant process operates continuously without the addition of acidifiers or dilution with recycled brine and/or chlorate.

Without added make-up brine at least a portion of the reaction product in aging tank 7 is withdrawn and electrolyzed in cell 13. Therefore, to maintain the level of liquid in the system and aid in the control of the pH within the desired range sodium hydroxide 2 is metered into line 18, and blended with recycle product 19 to provide a sodium hydroxide concentration of about 2 to about 7 percent, and more specifically, about 4 to about 5 percent. The amount of sodium hydroxide metered into the system is regulated by level control 6 which moves upwardly and downwardly to coincide with the level of liquid in aging tank 7. As the level of liquid recedes, level control 6 actuates control valve 4 which meters sodium hydroxide solution into line 18. When makeup sodium hydroxide is added, the level of liquid in tank 7 will rise and control 6 will deactivate valve 4.

Reaction product 19 in ageing tank 7 typically will have about 95 grams per liter sodium chlorate, about 1 to 7 grams per liter sodium hypochlorite and about 270 grams per liter sodium chloride. At least part of this reaction product may be fed to electrolytic cell 13 as the sole source of electrolyte feed in order to electrolyze the sodium chloride and make a solution having a higher concentration of sodium chlorate and a reduced concentration of sodium chloride. More specifically, the electrolysis of reaction product 19 typically will provide a cell liquor having about 450 grams per liter sodium chlorate and about 125 grams per liter sodium chloride.

Electrolysis may be carried out in any suitable electrolytic cell equipped with anode 14 and cathode 15 in spaced relationship with each other. Cell 13 illustrated in the drawing containing no diaphragm or membrane disposed between anode 14 and cathode 15 is but one example of any electrolytic cell which is used specifically for the production of alkali metal chlorate. In the absence of such a diaphragm or membrane chlorine produced at the anode is able to react with the caustic soda produced at the cathode to produce sodium chlorate. U.S. pat. No. 3,732,153 illustrates an example of a preferred chlorate-type electrolytic cell for use in the present invention. However, electrolytic cells equipped with a diaphragm made of asbestos either alone or reinforced with resinous polymeric materials or membranes fabricated from cationic permselective materials, such as those available from E. I. DuPont under the trademark "Nafion" may also be used in the present invention, U.S. Pat. Nos. 3,464,901 and 3,897,320 disclose both diaphragm and membrane type chlor-alkali cells which may be used in the production of alkali metal chlorate according to the present invention.

Sodium chlorate crystals may be prepared from cell liquor 16 treated in chlorate crystallizer 18 of any conventional design. Alternatively, cell liquor 16 may be processed by selective crystallization of the sodium chlorate from an aqueous solution containing sodium chloride, which comprises introducing sodium hydroxide into said solution in an amount sufficient to depress the solubility of the sodium chlorate in cooling the solution from an initial temperature of from 80° to 100° C. to a final temperature of from about 25° to 40° C. The solubility of the sodium chlorate is greatly reduced whereas the solubility of the sodium chloride is not appreciably affected. Details of the process are disclosed in U.S. Pat. No. 3,690,845 which patent is incorporated-by-reference herein.

Chlorate-containing solution, such as R-2 solution containing about 340 grams per liter sodium chlorate and about 200 grams per liter sodium chloride can also be prepared from cell liquor 16 by the addition of brine solution 17. The sodium chlorate-chloride containing liquor is blended with brine in a sufficient amount to provide a solution having a chloride to chlorate mole ratio of about 1.00 to about 1.09.

The following specific examples demonstrate the process of the instant invention, however, it is to be understood that these examples are for illustrative purposes only and do not purport to be wholly definitive as to conditions and scope.

EXAMPLE I

Part A

Continuous Chemical Chlorate

A continuous laboratory scale reaction system was set up for the chemical production of alkali metal chlorate. The system consisted of three, 6 element in-line static mixers connected in a series arrangement operating under turbulent conditions to ensure good contact in the reaction between the caustic soda, chlorate-containing recirculation liquor and chlorine feed stream. Product from the in-line mixers was discharged into a titanium metal "Hypo" decay column having a capacity of up to 27 liters for residence time to allow residual hypochlorite in the reaction mixture to convert to sodium chlorate. The chlorate-containing liquor in the "Hypo" decay column was pumped from the bottom of the column by means of an Eastern magnetic drive centrifical pump and recirculated to the static mixers after cooling in a titanium metal double pipe heat exchanger. To maintain the desired level of product in the decay column recirculation liquor may be withdrawn just prior to the NaOH addition port using a Sigma metering pump. Before entering the static mixer, a 22% solution of sodium hydroxide was added to the chlorate-containing recirculation liquor feed by means of a Sigma metering pump. The recirculation ratio of recirculation liquor per gallon of 22 percent NaOH feed was maintained to minimize pH control difficulties. Chlorine was added to the system just prior to the static mixers using a calibrated ¼ inch rotameter. The chlorine gas was diluted by a factor of 10% using nitrogen to prevent buildup of localized dangerous gas mixtures. Thermocouples and pH electrodes were placed in key positions in the continuous reaction system to monitor the reaction temperature and pH. Single probe pH electrodes were installed at the 22% sodium hydroxide addition port, the feed line to the decay column and the discharge line from the decay column.

The use of conventional metallic materials of construction in this laboratory setup was avoided since metallic ions catalyze the decomposition of hypochlorite to salt and oxygen. The materials of construction consisted of glass, titanium, polypropylene, rubber tubing and polyvinyl chloride. The entire apparatus was insulated with asbestos cloth to minimize heat loss and to shield the liquor from light exposure.

Several tests were conducted using the continuous flow reaction system described above for the chemical production of sodium chlorate by modifying reaction temperatures, pH, decay column residence time and recirculation ratios. Table I below provides the results of the tests.

TABLE I

| Test | Recirculation Ratio * | Mole Ratio NaOH/$Cl_2$ | Reaction Temp. °C. Feed | pH Decay Col. Exit | pH Decay Col. Mixer | Residence Time Static Col. | Residence Time Decay Feed | Hypochlorate Concentration (g/l) Static Mixer Feed | Hypochlorate Concentration (g/l) Decay Col. Exit | Hypochlorate Concentration (g/l) Decay Col. Yield | % $NaClO_3$ |
|---|---|---|---|---|---|---|---|---|---|---|---|
| 1 | 150 | 1.99 | 70 | 6.9–7.5 | 6.8–7.4 | 12 sec. | 1.6 min. | 7.4 | 7.0 | 5.8 | 94.5 |
| 2 | 150 | 1.71 | 70 | 6.6–6.8 | 6.4–6.6 | 12 sec. | 1.6 min. | 4.6 | 4.1 | 3.2 | 95.9 |
| 3 | 25 | 2.02 | 70 | 6.9–7.5 | 6.6–7.2 | 1.2 min | 9.6 min. | 15.0 | 8.7 | 4.4 | 95.1 |
| 4 | 25 | 1.93 | 70 | 7.1–7.5 | 6.6–7.2 | 1.2 min. | 9.6 min. | 13.3 | 6.4 | 3.1 | 95.8 |
| 5 | 90 | 1.86 | 70 | 6.6–6.9 | 6.3–6.5 | 21 sec. | 2.8 min. | 6.4 | 4.6 | 3.7 | 93.9 |
| 6 | 25 | 2.04 | 70 | 8.5–9.5 | 8.5–9.5 | 1.2 min. | 9.6 min. | 76.3 | 72.2 | 69.4 | 50.3 |
| 7 | 25 | 2.02 | 90 | 7.1–7.8 | 6.2–6.7 | 1.2 min. | 9.6 min. | 11.6 | 7.1 | 2.5 | 92.8 |
| 8 | 25 | 1.71 | 50 | 6.7–7.4 | 6.2–6.6 | 1.2 min. | 9.6 min. | 13.9 | 8.6 | 5.6 | 97.8 |
| 9 | 25 | 2.02 | 90 | 8.7–9.8 | 8.6–9.2 | 1.2 min. | 9.6 min. | 59.6 | 56.4 | 52.4 | 56.4 |

*Gallons recycled product/gallon 22% NaOH

Table I demonstrates an overall yield of sodium chlorate of 95 to 96% using the continuous flow reaction system by operating at a reaction temperature of about 70° C. pH of about 8 or higher provided significantly lower yields of sodium chlorate.

Part B

Electrochemical Preparation of Sodium Chlorate from Chemical Chlorate (part A)

The mole ratio of $NaClO_3$ to NaCl in the solutions prepared in Part A are 1 to 5+. Typical compositions of these solutions are about 8%. $NaClO_3$, 22.5% NaCl and about 69.5% $H_2O$. The pH of this solution is adjusted, sodium dichromate is added, and it is fed to a $NaClO_3$ producing electrolytic cells where much of the NaCl present is converted to $NaClO_3$ electrolytically. The effluent from the electrolytic cells contain about 470 g/l $NaClO_3$ and 130 g/l NaCl, 2 g/l $Na_2Cr_2O_7$, and 2 g/l NaClO. This solution is heated to promote the conversion of NaClO to $NaClO_3$, treated to remove residual NaClO. Chromate is removed by the addition of barium chloride to precipitate barium chromate. The solution is filtered and the composition adjusted to R-2 solution by the addition of nearly saturated NaCl brine and water.

When solid $NaClO_3$ is desired, the cell effluent is treated to remove NaClO and dichromate then heated and evaporated to crystallize some of the NaCl, then cooled to crystallize $NaClO_3$. The solid NaCl is dissolved and returned to the cell system for further electrolysis. The mother liquor from the NaClO₃ crystallization is recycled to the evaporator-NaCl crystaller for further processing.

While the invention has been described in conjunction with specific examples thereof, this is illustrative only. Accordingly, many alternatives, modifications and variations will be apparent to those skilled in the art in light of the foregoing descriptions and it is therefor intended to embrace all such alternatives, modifications and variations as to fall within the spirit and broad scope of the appended claims.

I claim:

1. A continuous process for the preparation of alkali metal chlorate-containing solutions which comprises (I) preparation of a reaction product (c) comprising an aqueous solution of an alkali metal chloride, alkali metal chlorate and alkali metal hypochlorite, said reaction product (c) prepared by mixing and chemically reacting (a) a solution comprising alkali metal hydroxide and (b) chlorine in an amount sufficient to maintain the pH of the reaction mixture at about 5 to 7.5 without further dilution and acidification during the process and to promote conversion of the alkali metal hypochlorite to alkali metal chlorate, the reactant (a) being prepared by diluting the alkali metal hydroxide with at least a portion of reaction product (c), and (II) electrolyzing at least a portion of reaction product (c) in an electrolysis cell for preparation of a solution having at least 335 grams per liter alkali metal chlorate and at least 100 grams per liter alkali metal chloride.

2. The process of claim 1 wherein reactant (a) is prepared by diluting a solution of about 20 to about 22% sodium hydroxide with a portion of reaction product (c).

3. The process of claim 2 wherein reaction product (c) comprises from about 70 to about 110 grams per liter sodium chlorate, from about 0.2 to about 15 grams per liter sodium hypochlorite and from about 250 to about 300 grams per liter sodium chloride.

4. The process of claim 2 wherein a sufficient amount of chlorine is employed in the reaction mixture to provide a pH of about 6 to about 7.

5. The process of claim 4 wherein the chlorine is derived at least in part fom chlorine-containing uncondensed gases from chlorine liquifaction and/or residues from chlorine tank car return.

6. The process of claim 1 wherein reactant (a) after dilution comprises from about 2% to about 7% sodium hydroxide.

7. The process of claim 1 wherein the cell is a diaphragmlesstype chlorate electrolytic cell or diaphragm-containing chloralkali cell.

8. The process of claim 1 wherein the alkali metal chloratechloride containing liquor is removed from the cell and blended with brine to prepare a solution having a chloride to chlorate mole ratio from about 1.00 to about 1.09

9. A continuous process for the preparation of alkali metal chlorate crystals which comprises (I) preparation of a reaction product (c) comprising an aqueous solution of an alkali metal chloride, alkali metal chlorate, and alkali metal hypochlorite, said reaction product (c) prepared by mixing and chemically reacting (a) a solution comprising alkali metal hydroxide and (b) chlorine in an amount sufficient to maintain the pH of the reaction mixture at about 5 to about 7.5 without further dilution and acidification during the process and to promote conversion of the alkali metal hypochlorite in reaction product (c) to alkali metal chlorate, the reactant (a) being prepared by diluting the alkali metal hydroxide with at least a portion of reaction product (c), (II) electrolyzing at least a portion of reaction product (c) in an electrolysis cell, and (III) removing and crystallizing the chlorate-containing cell liquor.

10. The process of claim 9 wherein reactant (a) is prepared by diluting a solution of about 20 to about 22% sodium hydroxide with a portion of reaction product (c).

11. The process of claim 10 wherein a sufficient amount of chlorine is employed in the reaction mixture to provide a pH of about 6 to about 7.

12. The process of claim 11 wherein the chlorine is derived at least in part from chlorine-containing uncondensed gases from chlorine liquifaction and/or residues from chlorine tank car return.

13. The process of claim 9 wherein reactant (a) after dilution is an aqueous solution comprising from about 2 to about 7% sodium hydroxide.

* * * * *